United States Patent [19]

Saunders

[11] 4,305,379
[45] Dec. 15, 1981

[54] SOLAR ENERGY FLUID HEATING SYSTEM

[76] Inventor: Norman B. Saunders, 15 Ellis Rd., Weston, Mass. 02193

[21] Appl. No.: 123,915

[22] Filed: Feb. 22, 1980

[51] Int. Cl.³ .............................................. F24J 3/02
[52] U.S. Cl. ..................................... 126/420; 126/437
[58] Field of Search ............... 126/420, 421, 422, 423, 126/432, 435, 437, 434; 165/71

[56] References Cited

U.S. PATENT DOCUMENTS

| | | | |
|---|---|---|---|
| 2,059,231 | 11/1936 | Hamilton | 165/71 |
| 4,027,821 | 6/1977 | Hayes et al. | 126/422 |
| 4,044,754 | 8/1977 | Cronin et al. | 126/420 |
| 4,044,948 | 8/1977 | Bottum et al. | 126/435 |
| 4,232,655 | 11/1980 | Frissora et al. | 126/420 |
| 4,237,862 | 12/1980 | Embree | 126/420 |

OTHER PUBLICATIONS

"Solar Heating Systems Design Manual", Bulletin Tese-576, Copyright, 1976, pp. 4-8 through 4-15, ITT, Training and Education Department, Fluid Handling Division.

*Primary Examiner*—James C. Yeung
*Attorney, Agent, or Firm*—Schiller & Pandiscio

[57] ABSTRACT

A closed solar water heating system automatically replaces, with air, the water which may be subjected to freezing when the system is in a nonoperative mode.

7 Claims, 3 Drawing Figures

SOLAR ENERGY FLUID HEATING SYSTEM

The present invention relates generally to hot water systems, and more particularly to systems for heating water with solar energy.

Systems for heating water with solar energy are well known. Typically, such systems include some type of collector for collecting the solar energy directly from the sun and heating the water. The water can then be transferred to a storage tank where it can be subsequently used. Such systems have obvious advantages in cold climates including the conservation of costly fuel. However, an inherent problem with such systems is that at least part of the system is exposed to the cold temperatures so that when the system is not operating problems associated with water freezing within the system can arise.

Although various means have been devised to prevent damage to the system from freezing water, they are generally complicated, expensive, hazardous, and/or difficult to install.

It is an object of the present invention to provide a solar energy heated water system which substantially overcomes or reduces the foregoing problems associated with the prior art devices.

Another object of the present invention is to provide an improved solar energy heated water system which includes means for preventing damage from freezing water and is relatively simple, inexpensive and easily assembled and installed.

These and other objects are achieved by a system of the type comprising collecting means for heating fluid with solar energy, storage means for storing fluid heated by the collecting means, first fluid conducting means for conducting fluid from the collecting means to the storage means, second fluid conducting means for conducting fluid to the collecting means, and pump means for transferring fluid through the second fluid conducting means to said collecting means, and from said collecting means through said first fluid conducting means to said storage means. The improvement comprises container means for containing air. The container means is coupled to the system so that air can be transferred to and from one of the fluid conducting means. The pump means is operable in an operative mode wherein fluid is transferred through the second fluid conducting means to said collecting means and from said collecting means, through the first fluid conducting means to the storage means forcing air into the container means, and a nonoperative mode wherein the fluid disposed in those portions of said system exposable to temperatures below the freezing point of said fluid is automatically displaced with air from the container means.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein.

In the drawings the same numerals refer to like parts.

Figure 1:
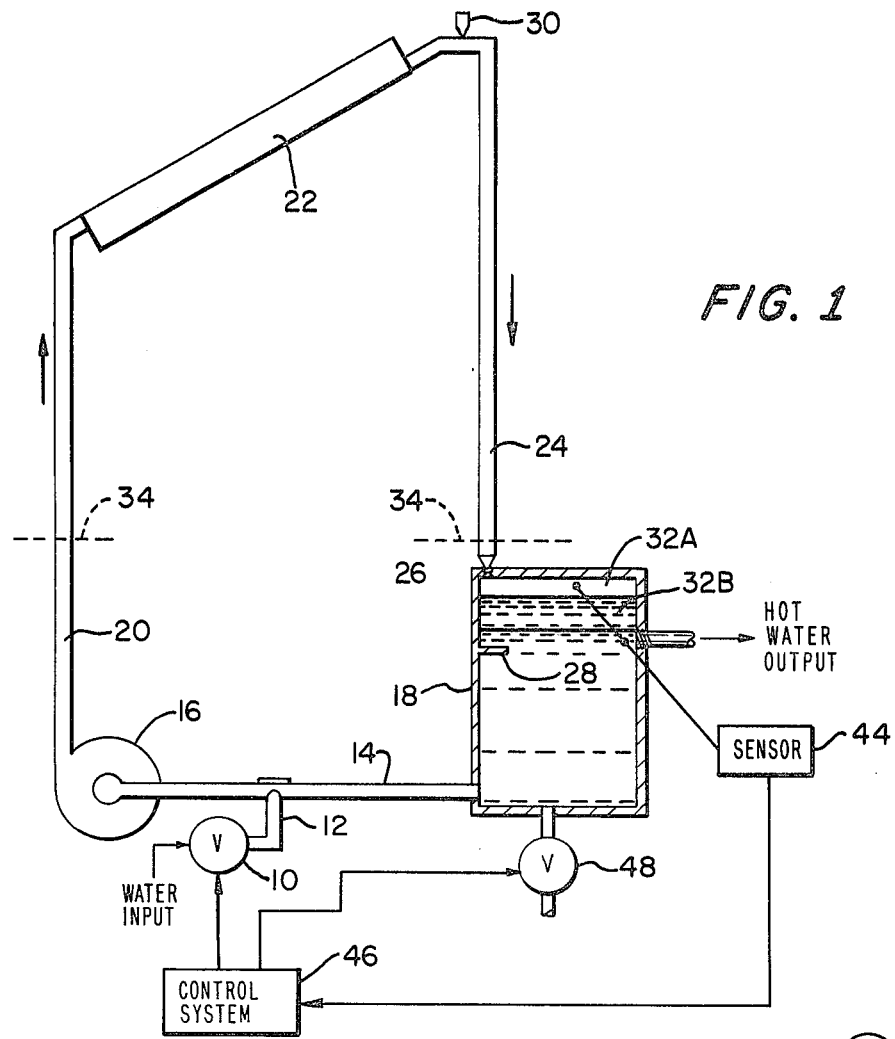
FIG. 1 shows a schematic view of the preferred embodiment of the present invention.
Figures 2, 3:
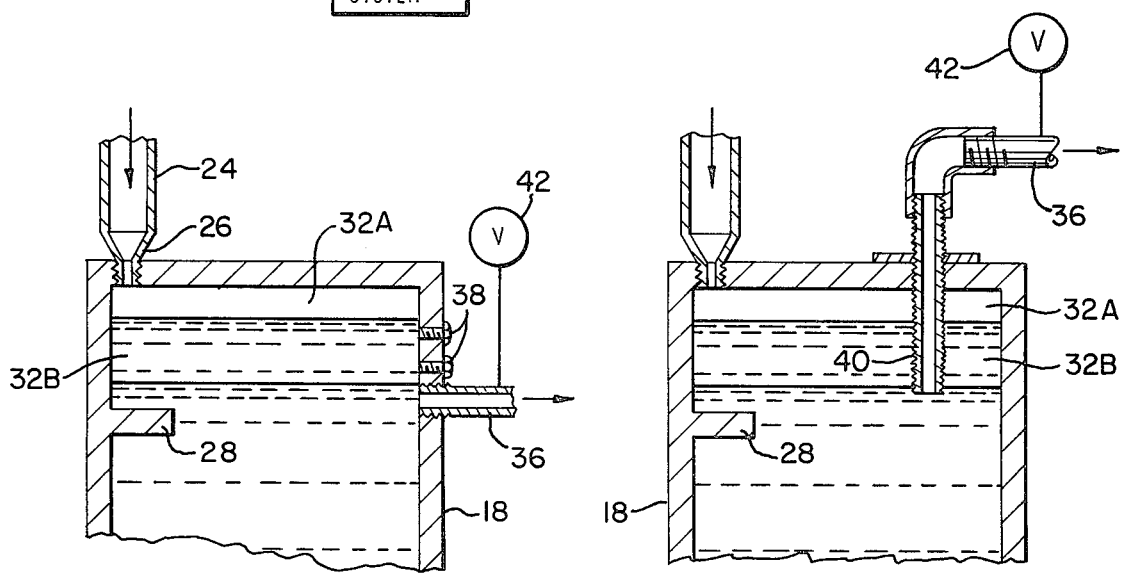
FIG. 2 shows details of the system of FIG. 1.
FIG. 3 shows details of a modification to the details of FIG. 2.

The preferred system for heating a fluid such as water with solar energy is shown in FIG. 1. The system includes a water input valve 10 electromechanically responsive to a control signal so that the valve is open when no signal is provided and closed when provided with the control signal. The valve 10 when open introduced fresh water into the system via the pipe 12. Pipe 12 is suitably connected to feed and return pipe 14, the latter being connected at one end to pump means 16 and at its other end to storage tank means 18. Pump means 16 is of a type, such as a centrifugal pump, for allowing appreciable back seepage of water when in a nonoperative mode, and for pumping water from feed pipe 14 through a fluid conducting means in the form of pipe 20 to the solar collector 22. The latter heats water transferred therethrough and may be any type which is known in the art so long as the internal manifolding of the collector allows complete drainage of water from the collector when there is inadequate support for the columns of water contained therein. The heated water is transferred through the fluid conducting means in the form of pipe 24 to the tank 18. The pipe 24 is connected to the top of tank 18 with portion 26 of a reduced internal diameter, as best shown in FIGS. 2 and 3, so as to create back pressure in the pipe 24. The position of the portion 26 is preferably adjacent an internal side wall of the tank 18 so that water flows down the side of the tank.

Tank 18 includes means in the form of shelf 28 for directing the heated water returning from collector 22 substantially horizontally across the tank 18. The shelf 28 is preferably positioned beneath the portion 26 just below the normal water level of tank 18.

The system includes air. Primarily, air is introduced with the incoming water through valve 10 when the latter is open. The incoming cold water normally contains more dissolved air than it can hold after being heated in collector 22. Much of the dissolved air is therefore released when the water is heated. In some applications, however, the released air will be insufficient to maintain the required air volume as described hereinafter. Accordingly, the system includes means for introducing air into the system comprising a one way air valve 30 in the top portion of pipe 24 adjacent collector 22 so that air is introduced into pipe 24 when the internal pressure within pipe 24 falls below the external atmospheric pressure.

In accordance with the principles of the present invention the system includes a sufficient amount of air, generally indicated at 32A and 32B so that when the pump 16 is operating water is transferred through pipe 20 into collector 22 where it is heated, then through pipe 24 forcing a predetermined volume of air into storage tank 18. The amount of air provided in storage tank 18 in the volume indicated at 32A is equal to the internal volume of those portions of the system which are exposable to freezing temperatures below 0° C. while the volume indicated at 32B is excess air provided as a reserve. For purposes of illustration and not limitation those portions of the system subjected to freezing are indicated as those above the lines 34 so as to include a portion of pipe 20, collector 22 and a portion of pipe 24. The air 32A and 32B in tank 18 is disposed below lines 34 and thus below the portions subjected to freezing so that when pump 18 is in a nonoperative mode the air within volume 32A in tank 18 will displace all water in those portions subjected to freezing.

Since the volume of the portions of the system exposed to freezing temperatures can vary from installation to installation, and since system water pressures differ, tank 18 includes means for varying or adjusting the predetermined volume of air 32A and 32B contained in tank 18. As shown in FIG. 2 the means can take the form of connecting the output pipe 36 to any one of the plurality of plugged taps 38 in the storage tank 18 located at various heights of the tank for drawing water from the tank. Alternatively, a water output tube 40 connected to pipe 36 can be adjustably mounted in the top of the tank such as providing the tube 40 with external threads and rotating the tube in the screw threaded opening in the top of the tank to move it up or down decreasing or increasing the volume of air which can be trapped.

Suitable means such as release valve 42 are provided for preventing excess pressure from building up in tank 18. Such means are preferably designed to release water when such excess pressure is present so that the volume of air 32A and 32B remain substantially unchanged. The valve can be tapped into the pipe 36 as shown in FIGS. 2 and 3. Alternatively, a second pipe (not shown) similar to pipe 40 and connected to the pressure release valve 42 can be used.

The system may further include control means for controlling the water input through valve 10 to maintain the requisite volume of trapped air and therefore air provided through air valve 30. The control means comprises a sensor 44 for detecting the presence of water adjacent at the top of tank 18. When sensor 44 senses water it provides a suitable signal to the control system 46 which in turn provides (1) a signal to valve 10, closing the latter so as to prevent additional water from being introduced into pipe 14 and (2) a signal to electromechanical drain valve 48, opening the latter so as to drain water from tank 18. After the level of water falls below the outlet provided by pipe 36 or tube 40, the sensor will not provide output signals, valve 48 closes and valve 10 opens. Draining tank 18 in this manner permits the entry of air through valve 30.

Initially, cold water introduced through valve 10 contains air which is released in tank 18 when heated by collector 22. The air is trapped above the outlet provided by pipe 36 or tube 40. The volume 32A and 32B is actually compressed by some "gauge" water pressure into some fraction of its original volume. This is taken into account when determining volumes 32A and 32B. In operation, pump 16 is operated so as to pump water through pipe 20, collector 22, and down pipe 24. The heated water from collector 22 forces air into tank 18 and runs down the side of the tank to the shelf 28. The colder water at the bottom of tank 18 is returned through pipe 14 to pump 16. So long as pump 16 is operating, sufficient water pressure is provided to keep the air of volumes 32A and 32B in the tank 18. The water flows in a closed system from pump 16, through pipe 20 to collector 22, then through pipe 24 to tank 18, back to pump 16 through pipe 14. As water is drawn off through pipe 36 water is introduced through valve 10. When pump 16 is shut off, back seepage of water through pump 16 occurs allowing the air of volume 32A in tank 18 to displace water in the portions of the system above lines 32.

The portion 26 of pipe 24 of reduced diameter insures that the pump 16 when operating, works only against friction losses plus a predetermined hydrostatic head equal to the heights of volumes 32A and 32B. This is true even though the head at the start up of the pump is from the top of volume 32A to the valve 30.

Introducing feed water via pipe 12 into pipe 14 between tank 18 and pump 16 increases system efficiency since the water forced into collector 22 usually is the coldest available.

The system thus described provides a way to prevent freezing of water in a solar energy hot water system in an inexpensive, easy manner.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In a system of the type comprising collecting means for heating fluid with solar energy, storage means including a storage tank for storing fluid heated by said collecting means, first fluid conducting means connected between said collecting means and said storage means for conducting fluid from said collecting means to said storage means, second fluid conducting means for conducting fluid to said collecting means, and pump means for transferring fluid through said second fluid conducting means, collecting means, first fluid conducting means and said storage means, the improvement comprising:

container means including a predetermined volume of said tank for containing a predetermined volume of air and coupled to said first fluid conducting means, and means including a tube adjustably mounted in the top of said tank so that said tube can be raised or lowered with respect to said tank for adjusting said predetermined volume;

wherein said pump means is operable in an operative mode so that fluid is transferred through said second fluid conducting means, collecting means and said first fluid conducting means to said storage means forcing air into said container means, and a nonoperative mode so that the fluid disposed in those portions of said system exposable to temperatures below the freezing temperature of said fluid is displaced with air from said container means and wherein said predetermined volume is greater than the volume of said portions exposable to temperatures below said freezing temperatures, and said pump means allows back seepage of fluid when in said nonoperative mode.

2. A system according to claim 1, wherein said predetermined volume is disposed below said portions exposable to temperatures below said freezing temperatures so that air displaces fluid in said portions.

3. A system according to claim 1, wherein said pump means is connected to said second fluid conducting means, and said first conducting means is connected to the top of said tank, and said system further includes third fluid conducting means for conducting fluid from said storage means to said pump means.

4. A system according to claim 3, wherein said fluid is water, said system further comprising means for introducing fresh water into said third fluid conducting means.

5. A system according to claim 1, wherein said first fluid conducting means is connected to the top of said tank and said tank includes means for directing fluid transferred from said first fluid conducting means to said tank in a substantially horizontal direction across said tank.

6. A system according to claim 1, wherein said first fluid conducting means includes a tube of a predetermined internal diameter and a reduced internal diameter portion connecting said tube to said tank.

7. In a hot water system of the type comprising collecting means for heating fluid with solar energy, storage means including a storage tank for storing fluid heated by said collecting means, first fluid conducting means connected between said collecting means and said storage means for conducting fluid from said collecting means to said storage means, second fluid conducting means for conducting fluid to said collecting means, and pump means for transferring fluid through said second fluid conducting means, collecting means, first fluid conducting means, and said storage means, the improvement comprising:

container means including a predetermined volume of said tank for containing a predetermined volume of air and coupled to said first fluid conducting means, and means including a plurality of taps in said tank located at various heights of said tank for drawing fluid from said tank from any one of said taps so as to adjust the predetermined volume, wherein said pump means is operable in an operative mode so that fluid is transferred through said second fluid conducting means, collecting means and said first fluid conducting means to said storage means forcing air into said container means, and a nonoperative mode so that the fluid disposed in those portions of said system exposable to temperatures below the freezing temperature of said fluid is displaced with air from said container means, and wherein said predetermined volume is greater than the volume of said portions exposable to temperatures below said freezing temperatures, and said pump means allows back seepage of fluid when in said nonoperative mode.

* * * * *